United States Patent Office 3,530,402
Patented Sept. 22, 1970

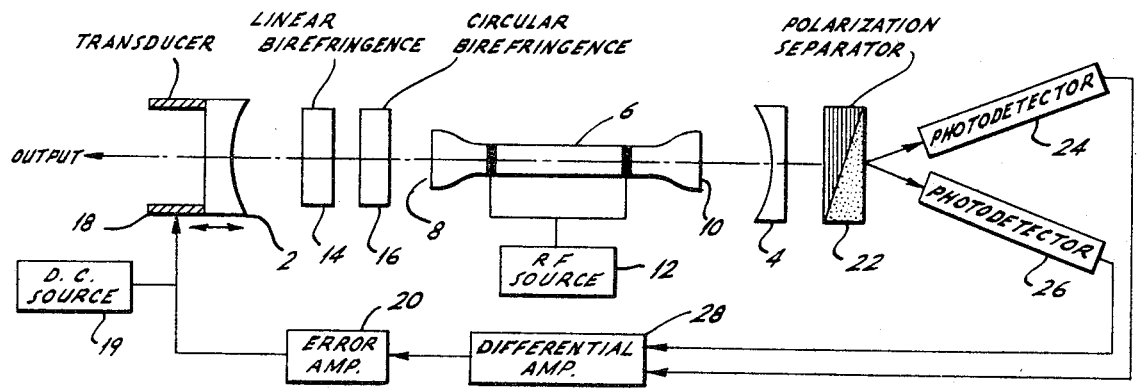
FIG. 1.
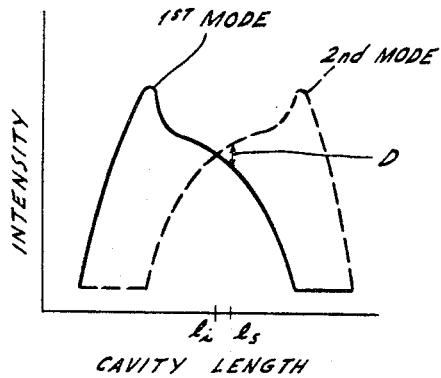
FIG. 2A. (WEAK COUPLING)
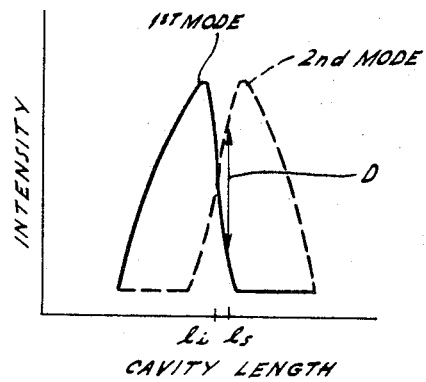
FIG. 2B. (NEAR CRITICAL COUPLING)
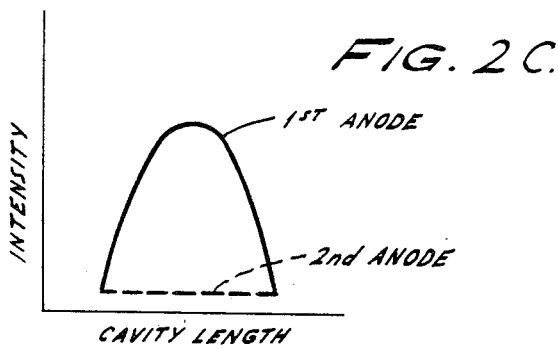
FIG. 2C. (STRONG COUPLING)
INVENTORS
WALTER M. DOYLE
MATHEW B. WHITE
BY Leonard Zalman
ATTORNEY

3,530,402
LASER FREQUENCY STABILIZATION SYSTEM
Walter M. Doyle, Laguna Beach, and Matthew B. White, Newport Beach, Calif., assignors to Philco-Ford Corporation, Philadelphia, Pa., a corporation of Delaware
Filed Apr. 26, 1968, Ser. No. 724,484
Int. Cl. H01s 3/00
U.S. Cl. 331—94.5         9 Claims

ABSTRACT OF THE DISCLOSURE

A laser frequency stabilization system wherein circular birefringence and linear birefringence are established within the laser cavity. By choosing the proper ratio of circular birefringence to linear birefringence, a very sharp frequency discriminant can be obtained.

---

Due to the mechanical instability of laser cavity dimensions, the frequencies of laser output signals tends to be unstable. Two methods of laser frequency stabilization which make use of the unique properties of the dual polarization laser described in our co-pending U.S. patent application No. 475,757, filed July 29, 1965 are described in our co-pending U.S. patent application No. 593,212, filed Nov. 9, 1966. These proposed systems utilize an intercavity birefringence element to establish oscillating laser modes having orthogonal linear polarizations and a controlled frequency separation. These modes are stabilized in symmetric positions relative to the center frequency of the fluorescence profile of the laser medium by comparing the intensities or amplitudes of the two modes and, if their intensities differ, varying the laser cavity length so as to null this intensity difference.

More recently, laser frequency stabilization systems based on the "Zeeman laser" have been proposed. In these systems, a laser with internal mirrors is placed in an axial magnetic field which restricts laser oscillations to two mutually orthogonal circularly polarized modes. In a fashion similar to the dual polarization laser stabilization systems previously described, the circularly polarized modes are stabilized in symmetric positions relative to the center frequency of the fluorescence profile of the laser medium by comparing their intensities and, if their intensities differ, varying the laser cavity length so as to null this intensity difference.

It has been noted that an extremely sensitive frequency discriminant can be obtained with the latter frequency stabilization systems only when the two circularly polarized modes are close to being critically coupled, that is, when only a slight change in magnetic field intensity is sufficient to cause one of the modes to cease oscillation. However, critically coupled circularly polarized modes often do not exist within many laser transitions and, accordingly, a sensitive frequency discriminant cannot be obtained for these laser transitions.

It is an object of the present invention to provide an improved laser frequency stabilization system.

It is a further object of the present invention to provide a laser frequency stabilization system that has a very sensitive frequency discriminant.

It is a further object of the present invention to provide a laser frequency stabilization system that has a very sensitive frequency discriminant for many laser transitions.

In general, these and other objects of the present invention are achieved by a laser system comprising a plurality of reflectors which establish a closed optical path therebetween, the reflectors being separated by a given distance, a discharge tube disposed in said path and shaped so as not to favor any particular axial mode of oscillation, first means for introducing linear birefringence into said optical path, second means for introducing circular birefringence into said optical path, electromechanical transducer means coupled to one of the reflectors in a manner to control the length of the optical path defined by the reflectors, third means for generating a signal having an amplitude dependent upon the amplitudes of a plurality of modes of oscillation in the laser and control means for supplying said signal to the transducer means to maintain a fixed spacing between the two reflectors.

For a better understanding of the present invention together with other and further objects thereof, reference should now be had to the following detailed description which is to be read in conjunction with the accompanying drawings in which:

FIG. 1 is a schematic diagram of a preferred embodiment of the present invention; and FIG. 2 is a graph showing the amplitude relationship of selected laser modes as a function of cavity length and birefringence for the 2.03 u. He-Xe laser transition.

In FIG. 1 two confocal spherical reflectors 2 and 4 define the ends of an optical path extending therebetween. A laser tube 6 is disposed in said path. Typically laser tube 6 can comprise a plasma tube having fused silica end windows 8 and 10 which are normal or nearly normal to the optical path between reflectors 2 and 4. Each end window 8 and 10 can be anti-reflection coated, if necessary, in order to reduce optical losses within the laser system. Plasma tube 6 can include a mixture of helium and neon and, conveniently, the system can operate at the 1.15 micron He-Ne transition. A conventional electrical pumping source 12 is coupled to plasma tube 6 in a conventional manner.

Block 14 represents schematically apparatus for providing linear birefringence within the laser cavity. This device can be a retardation plate or an electro-optic cell such as, for example, a Kerr cell or Pockels cell which introduces a known linear birefringence into the laser cavity in response to an electrical signal supplied thereto. Alternatively, linear birefringence can be produced by stressing one of the windows 8 and 10 of tube 6.

Block 16 schematically represents apparatus for providing circular birefringence within the laser cavity. This apparatus can be a Faraday rotator disposed along the axis of the laser cavity or a system for applying an axial magnetic field to the laser plasma tube.

Reflector 2 is mounted on or is formed in the end of an electro-mechanical transducer 18, such as, for example, a piezoelectric transducer. A constant amplitude bias voltage source 19 is connected to transducer 18. The length of transducer 18 parallel to the optical axis of the laser is a function of the net amplitude of the voltage supplied by source 19 and the correction signals supplied thereto by error amplifier 20. Thus transducer 18 drives reflector 2 along the optical axis of the laser cavity in response to the correction signals supplied thereto by error amplifier 20.

Reflectors 2 and 4 are slightly transmissive so that some light energy exits the laser cavity through these reflectors. The light energy that exits through reflector 2 constitutes the output of the laser system. The light energy that exits through reflector 4 is intercepted by a polarization separator 22 such as, for example, a Wollastom prism, which spacially separates the oppositely polarized components contained in the light energy incident thereon. On of the two spacially separated components is supplied to a photodetector 24 and the other component is supplied to a photodetector 26. Photodetectors 24 and 26, which can be indium arsenide photodetectors, generate electrical signals having amplitudes proportional to the respective amplitudes of the light energy incident thereon. The output signals of photodetectors 22 and 24 are supplied to the input terminals of a differential amplifier 28, the output of which is coupled through error amplifier 20 to the electromechanical transducer 18.

The operation of the frequency stabilization system of FIG. 1 will now be explained in conjunction with FIG. 2 by using the 2.03 u. He-Xe laser transition as an example. When an appropriate linear birefringence is established across apparatus 14 and apparatus 16 is either absent or is adjusted to give zero circular birefringence, the only stationary modes that can be established involve light plane polarized in orthogonal directions, i.e., either perpendicular to or parallel to the plane that contains the direction of light propagation and the birefringent axis of apparatus 14. Light polarized in any other manner cannot simultaneously maintain its polarization state and fulfill the condition for constructive interference necessary for a stationary mode. In the absence of intra-cavity circular birefringence, the output intensities of two orthogonal polarized modes of a 2.03 u. He-Xe laser vary with cavity length as is shown in FIG. 2A. In this figure both modes oscillate over a considerable range of cavity lengths. The condition where mutually orthogonal modes are able to oscillate simultaneously over a considerable range of cavity lengths is referred to hereinafter as weak coupling.

It can be seen by inspection of FIG. 2A that the slopes of the intensity curves of the stationary modes are not steep at their point of intersection $l_t$. Since the error signal for frequency stabilization is obtained by taking the difference between the intensities of the stationary modes, the discriminant obtained with weak coupling is not very sharp. That is, a small shift in cavity length, for example, to length $l_s$, will produce only a small amplitude difference D between the two stationary modes and accordingly a slowly varying discriminant.

As the intra-cavity circular birefringence is increased from zero by means of apparatus 16, orthogonally polarized, allowed laser modes assume various states of elliptical polarization. The eccentricities of these elliptical polarization states are determined by the ratio of circular to linear birefringence. The range of cavity lengths over which two orthogonally polarized cavity modes can oscillate simultaneously is determined by the frequency separation between the modes, the polarizations of the modes, and the type laser transition involved. For intermode frequency separations that are substantially smaller than the natural line width of the laser transition involved, ratios of linear birefringence to circular birefringence can generally be chosen in such a way as to establish a condition where the range of cavity lengths over which two mode operation persists is quite small. The fact that this condition, which is referred to hereinafter as near critical coupling, can be established for all known rare gas laser transitions over a wide range of intermode frequency separations is of central importance, since it assures the general applicability of the stabilization system under discussion.

In FIG. 2B, the ratio of circular birefringence to linear birefringence has been adjusted to give near critical coupling for the 2.03 u. He-Xe transition. It can be seen by inspection of FIG. 2B that with near critical coupling the slopes of the intensity curves of the two stationary modes are very steep at their point of intersection $l_t$. Since a small shift in cavity length, for example, to length $l_s$, will now produce a large amplitude difference D between the two modes, this condition will produce a very sensitive discriminant and accordingly this condition is ideal for frequency stabilization.

In FIG. 2C the ratio of circular birefringence to linear birefringence has been adjusted to a value where one of the oscillation modes has been extinguished. This condition, termed strong coupling, must be avoided if frequency stabilization is to be achieved.

From the foregoing discussion it can be seen that the system of the present invention provides a very sensitive discriminant utilizing relatively simple electronic arrangements. Furthermore, a sharp discriminant can be produced for most laser transitions. In addition, the system of the present invention can determine the direction as well as the magnitude of the laser cavity length drift. This is achieved by measuring the amplitude of the signal supplied to transducer 18 or the polarity of the output signal of amplifier 28.

While the invention has been described with particular reference to a particular embodiment thereof, it will be apparent that various modifications and other embodiments in the scope of the invention will occur to those skilled in the art. Accordingly, it is desired that the scope of our invention be limited only by the appended claims.

We claim:

1. A laser system comprising a plurality of spaced reflectors positioned to define a closed optical path therebetween, at least one of said reflectors being partially transmissive, a laser plasma tube disposed in said path and shaped so as not to favor any particular axial mode of oscillation, first means for introducing linear birefringence into said closed optical path, second means for introducing circular birefringence into said closed optical path, and third means responsive to the respective amplitudes of a plurality of modes of said laser for stabilizing the frequency of the laser output signal.

2. The system of claim 1 wherein the ratio of circular birefringence to linear birefringence is adjusted to give near critical coupling for adjacent orthogonally polarized laser modes.

3. The system of claim 1 wherein said first means introduces said linear birefringence in response to an electrical signal supplied thereto and said second means comprises a system for providing the laser plasma tube with an axial magnetic field.

4. The system of claim 1 wherein said third means comprises transducer means coupled to one of said reflectors to drive said reflector parallel to said optical path in response to a signal supplied to said transducer, a differential amplifier coupled to said transducer means, first and second photodetectors coupled to respective input terminals of said differential amplifier, and a device positioned adjacent said partially transmissive reflector for spacially separating optical energy of opposite polarizations and for directing energy of one polarization to said first photodetector and energy of another polarization to said second photodetector.

5. The system of claim 4 wherein said first means is a Kerr cell or Pochels cell disposed in said optical path and said device is a Wollaston prism.

6. The system of claim 5 wherein said transducer means of claim 4 is a piezoelectric transducer.

7. A laser system comprising a plurality of spaced reflectors positioned to define a closed optical path therebetween, at least one of said reflectors being partially transmissive, a plasma tube disposed in said path and shaped so as not to favor any particular axial mode of oscillation, first means for restricting said laser oscillations to orthogonal modes, and second means for regulating the laser cavity length versus light intensity characteristics of said orthogonal modes so that at a selected cavity length the relative intensities of said modes changes rapidly with change in cavity length.

8. The laser system of claim 7 wherein said first means comprises means for introducing linear and circular birefringence into said laser cavity and said second means comprises a piezoelectric transducer.

9. The laser system of claim 8 wherein said system further comprises third means responsive to the respective amplitudes of said orthogonal modes for stabilizing the frequency of the laser output signal.

References Cited

UNITED STATES PATENTS

| | | |
|---|---|---|
| 3,361,990 | 1/1968 | Gordon et al. |
| 3,411,849 | 11/1968 | Aronowitz. |
| 3,431,514 | 3/1969 | Oshman et al. |
| 3,435,371 | 3/1969 | White. |
| 3,453,557 | 7/1969 | Polanyi et al. |

RONALD L. WIBERT, Primary Examiner

E. BAUER, Assistant Examiner